United States Patent
Zhai et al.

(10) Patent No.: US 11,145,089 B2
(45) Date of Patent: Oct. 12, 2021

(54) METHOD FOR MEASURING ANTENNA DOWNTILT BASED ON MULTI-SCALE DETECTION ALGORITHM

(71) Applicant: Wuyi University, Jiangmen (CN)

(72) Inventors: Yikui Zhai, Jiangmen (CN); Yihang Zhi, Jiangmen (CN); Huixin Guan, Jiangmen (CN); Ying Xu, Jiangmen (CN); Junying Gan, Jiangmen (CN); Tianlei Wang, Jiangmen (CN); Wenbo Deng, Jiangmen (CN); Qirui Ke, Jiangmen (CN)

(73) Assignee: Wuyi University, Jiangmen (CN)

( * ) Notice: Subject to any disclaimer, the term of this patent is extended or adjusted under 35 U.S.C. 154(b) by 0 days.

(21) Appl. No.: 16/652,325

(22) PCT Filed: Feb. 22, 2019

(86) PCT No.: PCT/CN2019/075900
§ 371 (c)(1),
(2) Date: Mar. 30, 2020

(87) PCT Pub. No.: WO2020/093624
PCT Pub. Date: May 14, 2020

(65) Prior Publication Data
US 2021/0142519 A1    May 13, 2021

(30) Foreign Application Priority Data
Nov. 7, 2018  (CN) .......................... 201811321929.9

(51) Int. Cl.
*G06T 7/00* (2017.01)
*H04B 17/10* (2015.01)
*H01Q 3/00* (2006.01)

(52) U.S. Cl.
CPC .............. *G06T 7/97* (2017.01); *H01Q 3/005* (2013.01); *H04B 17/104* (2015.01); *G06T 2207/10032* (2013.01); *G06T 2207/20084* (2013.01)

(58) Field of Classification Search
CPC ............. G06T 7/97; G06T 2207/10032; G06T 2207/20084; H01Q 3/005; H04B 17/104
See application file for complete search history.

(56) References Cited

U.S. PATENT DOCUMENTS

| 10,007,865 | B1* | 6/2018 | Kim .................. G06K 9/00624 |
| 2017/0077586 | A1* | 3/2017 | Li ......................... H01Q 1/125 |

(Continued)

FOREIGN PATENT DOCUMENTS

| CN | 105760856 A | 7/2016 |
| CN | 105761249 A | 7/2016 |

(Continued)

*Primary Examiner* — Ming Y Hon

(57) ABSTRACT

Disclosed is a method for measuring an antenna downtilt based on a multi-scale detection algorithm, including: capturing an image of an antenna using an unmanned aerial vehicle, and returning data to a server in real time; obtaining a ground truth box where the antenna is located by performing the multi-scale detection algorithm of a server; segmenting the ground truth box based on an antenna target segmentation algorithm of the server; and obtaining an antenna downtilt angle based on an antenna downtilt measurement algorithm of the server and determining whether the antenna properly functions. This method avoids the danger of tower worker climbing, is fast and accurate, saves labor costs and time, and ensures the measurement of an antenna downtilt to be smoother.

6 Claims, 3 Drawing Sheets

(56) References Cited

U.S. PATENT DOCUMENTS

| | | | | |
|---|---|---|---|---|
| 2018/0032840 A1* | 2/2018 | Yu | .............................. | G06T 7/11 |
| 2018/0068198 A1* | 3/2018 | Savvides | .............. | G06K 9/6274 |
| 2018/0158236 A1* | 6/2018 | Priest | ..................... | G01B 11/24 |
| 2020/0167601 A1* | 5/2020 | Deng | ....................... | G06N 3/08 |
| 2020/0327360 A1* | 10/2020 | Samala | .................... | G06K 9/34 |

FOREIGN PATENT DOCUMENTS

| | | | |
|---|---|---|---|
| CN | 107392901 A | 11/2017 | |
| CN | 107423760 A | 12/2017 | |
| CN | 107830846 A | 3/2018 | |
| JP | 2013160681 A | 8/2013 | |

* cited by examiner

METHOD FOR MEASURING ANTENNA DOWNTILT BASED ON MULTI-SCALE DETECTION ALGORITHM

CROSS REFERENCE TO RELATED APPLICATIONS

This application is a national stage application under 35 U.S.C. 371 of PCT Application No. PCT/CN2019/075900, filed on 22 Feb. 2019, which PCT application claimed the benefit of Chinese Patent Application No. 2018113219299, filed on 7 Nov. 2018, the entire disclosure of each of which are hereby incorporated herein by reference.

TECHNICAL FIELD

The present disclosure relates to the field of communication measurement, and more particularly, to a method for measuring an antenna downtilt based on a multi-scale detection algorithm.

BACKGROUND

At present, Antenna downtilt refers to included angle between an antenna on a signal tower and a vertical direction. The antenna downtilt is generally determined by making a comprehensive analysis on coverage area, terrain, site distribution of the area where the antenna is located, hanging height, and station spacing in combination with wireless communication environments such as regional population density. With the changes of urban population density, environment, and social development requirement for network optimization, it is required to timely detect an antenna downtilt angle to determine whether it is needed to adjust the angle. In this case, antenna downtilt information is particularly important. In most cases, it is difficult for network optimizers to obtain the antenna downtilt information. Traditional measurement methods require professional tower workers to measure the antenna downtilt on the tower. Therefore, the traditional measurement methods are labor-consuming and time-consuming, and are difficult to ensure safety if the antenna downtilt after network optimization is the same as that before the network optimization.

SUMMARY

To solve the above problems, an objective of embodiments of the present disclosure is to provide a method for measuring an antenna downtilt based on a multi-scale detection algorithm, so as to conveniently measure the antenna downtilt in combination of unmanned aerial vehicle and deep learning algorithm.

In order to solve the above problems, technical solutions are provided as follows according to the embodiments of the present disclosure.

There is provided a method for measuring an antenna downtilt based on a multi-scale detection algorithm, including:
capturing an image of an antenna using an unmanned aerial vehicle;
obtaining a ground truth box where the antenna is located by performing the multi-scale detection algorithm on the image of the antenna;
segmenting the ground truth box based on an antenna target segmentation algorithm of a server; and
obtaining an antenna downtilt angle based on an antenna downtilt measurement algorithm of the server.

Further, the obtaining a ground truth box where the antenna is located based on the multi-scale detection algorithm of the server includes:
obtaining predictive boxes through a basic convolutional network; and
obtaining the ground truth box through a multi-scale convolutional network.

Further, the obtaining predictive boxes through a basic convolutional network includes:
processing the image of the antenna by a plurality of series-connected convolutional layers, wherein the image of the antenna is max-pooled each time the image of the antenna is processed by one of the plurality of the series-connected convolutional layers;
outputting a feature map by processing the max-pooled image of the antenna by two fully-connected layers and multiple layers of convolution kernels of different scales; and
generating, on the feature map, the predictive boxes taking a center of the feature map as an origin and being concentric.

Preferably, the predictive boxes include two square predictive boxes and two rectangular predictive boxes.

Further, the obtaining the ground truth box through a multi-scale convolutional network includes:
outputting a class probability and an offset between a location of the antenna and the predictive box after processing the image of the antenna with the predictive boxes by two convolutional layers convoluted in parallel by two 3*3 convolution kernels;
connecting parameters of the class probability after performing a channel concat, and obtaining, by using a loss function, a candidate box with a class predictive value and a regression predictive value; and
obtaining the ground truth box by performing local maximum searching on the candidate box based on a non-maximum suppression algorithm.

Preferably, the loss function used by the multi-scale convolutional network is $$L(x, c, l, g) = \frac{1}{N}(L_{conf}(x, c) + \alpha L_{loc}(x, l, g));$$

wherein N represents the number of the predictive boxes, a represents a preset weight, $L_{conf}$ represents a classification loss, and $L_{loc}$ represents a location loss.

The segmenting the ground truth box based on an antenna target segmentation algorithm of a server includes:
constructing a minimum spanning tree by classifying pixels within the ground truth box of the image of the antenna whose color distances $L_0$ are close into one class; and
performing a regional fusion based on a determination result obtained by comparing an intra-class variation and an inter-class difference.

Preferably, the color distance $L_0$ is $L_0 = \sqrt{(r_1-r_2)^2+(g_1-g_2)^2+(b_1-b_2)^2}$, wherein r, g, and b represent color channels.

Preferably, the intra-class variation within one ground truth box is $$\text{Int}(c) = \max_{e \in (MST, E)} e,$$

wherein c represents a class, e represents a side having a minimum similarity in a minimum spanning tree of this class; the inter-class difference between two ground truth boxes is $$Diff(c_1, c_2) = \min_{v_i \in c_1, v_j \in c_2} \omega(v_i, v_j),$$

wherein $\omega(v_i, v_j)$ represents sides connecting Class $c_1$ and Class $c_2$, $v_i$ represents a point on the Class $c_1$ and $v_j$ represents a point on the Class $c_2$.

Beneficial effects of the embodiments of the present disclosure are as below. In the method for measuring an antenna downtilt based on a multi-scale detection algorithm according to the embodiments of the present disclosure, an image of an antenna captured by an unmanned aerial vehicle is processed based on deep learning networks to directly obtain an antenna downtilt angle. A ground truth box where the antenna is located can be accurately detected through the multi-scale detection algorithm, thereby improving the precision of obtaining the ground truth box, and ensuring the measurement of the antenna downtilt to be more accurate. This method avoids the danger of tower worker climbing, is fast and accurate, saves labor costs and time, and ensures the measurement of the antenna downtilt to be smoother.

BRIEF DESCRIPTION OF THE DRAWINGS

The present disclosure is further described below with reference to the accompanying drawings and examples.

DETAILED DESCRIPTION

Figure 1:
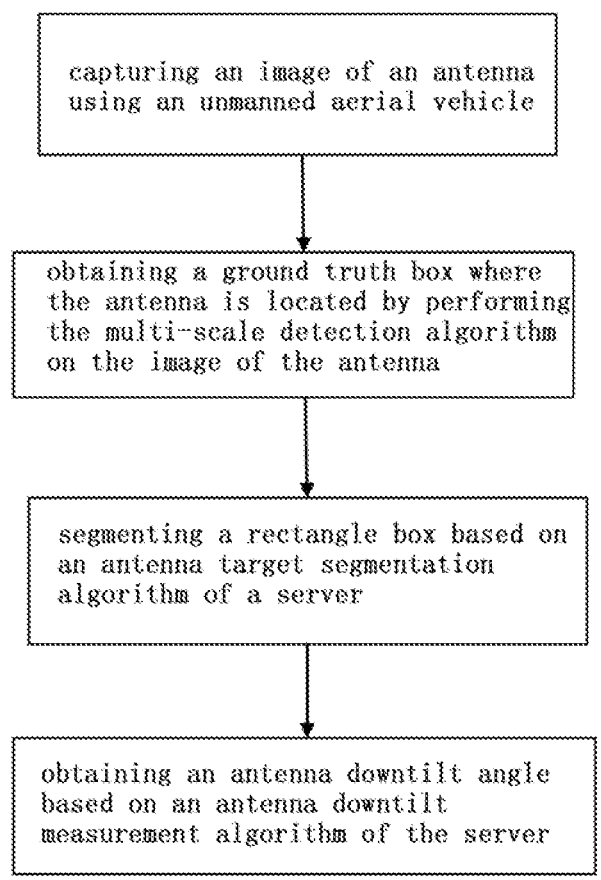
FIG. 1 is an overall flowchart of a method for measuring an antenna downtilt based on a multi-scale detection algorithm according to an embodiment of the present disclosure.

Referring to FIG. 1, In an embodiment of the present disclosure, a method for measuring an antenna downtilt based on a multi-scale detection algorithm is disclosed, including: capturing an image of an antenna using an unmanned aerial vehicle; obtaining a ground truth box where the antenna is located by processing the image of the antenna using the multi-scale detection algorithm; segmenting the ground truth box based on an antenna target segmentation algorithm of a server; and obtaining an antenna downtilt angle based on an antenna downtilt measurement algorithm of the server.

Preferably, the multi-scale detection algorithm includes a basic convolutional network for obtaining predictive boxes and a multi-scale convolutional network for obtaining a ground truth box. Finally, the ground truth box where the antenna is located is obtained, including abscissa and ordinate as well as length and width of the ground truth box.

Figure 2:
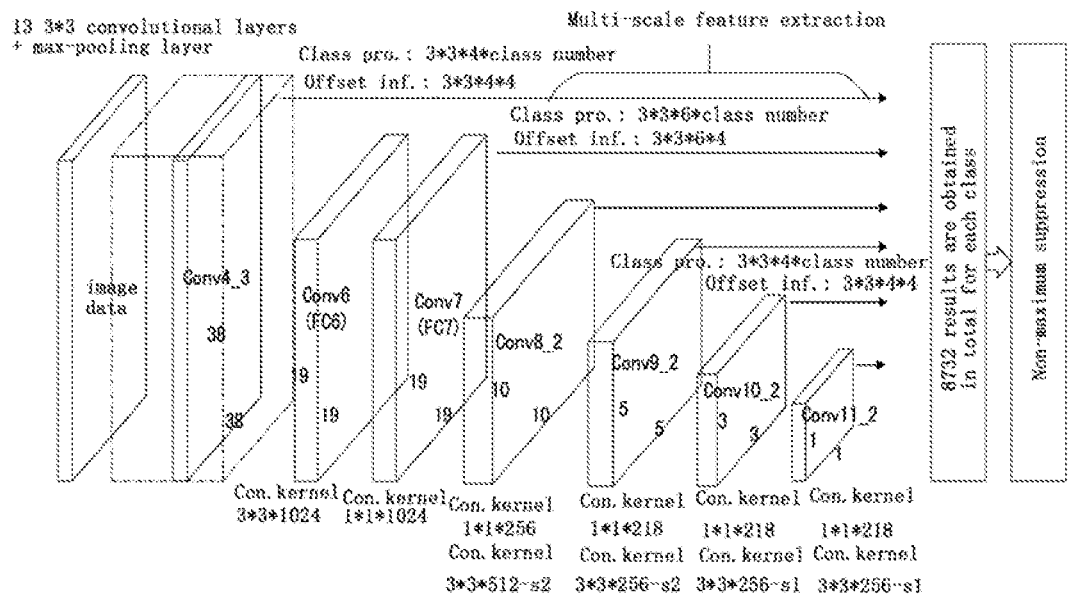
FIG. 2 is a structural diagram of a basic convolutional network according to an embodiment of the present disclosure.

Referring to FIG. 2, in one embodiment, the basic convolutional network is improved based on a VGG model, the image of the antenna is processed in sequence by a plurality of series-connected convolutional layers, and the image of the antenna is max-pooled each time the image of the antenna is processed by one of the series-connected convolutional layers. The plurality of series-connected convolutional layers include series-connected convolutional layers of two 64 convolution kernels, two 128 convolution kernels, three 256 convolution kernels, three 512 convolution kernels, and three 512 convolution kernels. The basic convolutional network outputs a feature map by processing the max-pooled image of the antenna by two fully-connected layers (i.e., a 3*3 convolutional layer FC6, and a 1*1 convolutional layer FC7) and four layers of convolution kernels of different scales. The feature map convolved in each layer is used as input of a next layer.

Figure 3:
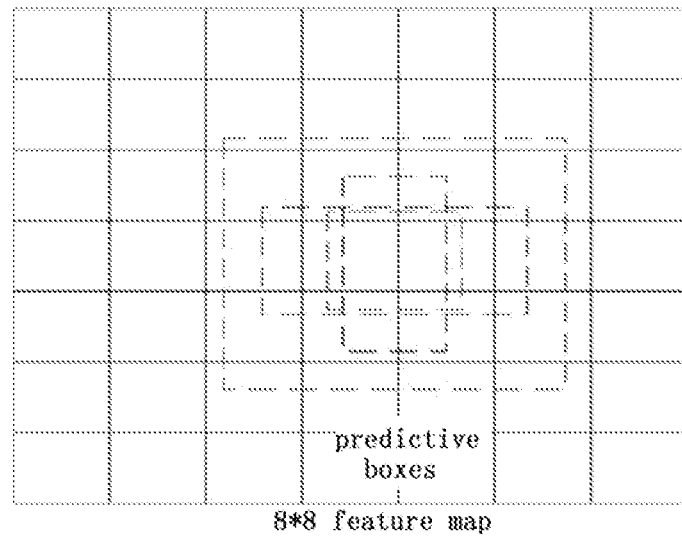
FIG. 3 is a schematic diagram of a predictive box according to an embodiment of the present disclosure.

Referring to FIG. 3, in one embodiment, the basic convolutional network generates, on the feature map, the predictive boxes taking a center of the feature map as an origin and being concentric, wherein the predictive boxes include two rectangular predictive boxes and two square predictive boxes. A side length of the smaller square predictive box is min_size; a side length of the larger square predictive box is $\sqrt{\text{min\_size} \times \text{max\_size}}$; a width of the rectangular predictive box is $$\frac{1}{\sqrt{2}} \times \text{min\_size};$$

and a length of the rectangular predictive box is $\sqrt{2} \times \text{min\_size}$.

A formula for calculating the side length of the predictive box is:

$$s_k = s_{min} + \frac{s_{max} - s_{min}}{m - 1}(k - 1), (k \in m),$$

where m represents the number of feature maps. For the predictive box of the feature map on the first layer, the minimum side length min_size is equal to $s_1$, and the maximum side length max_size is equal to $s_2$; or the minimum side length is equal to $s_2$, and the maximum side length is equal to $s_3$, and so on.

Figure 4:
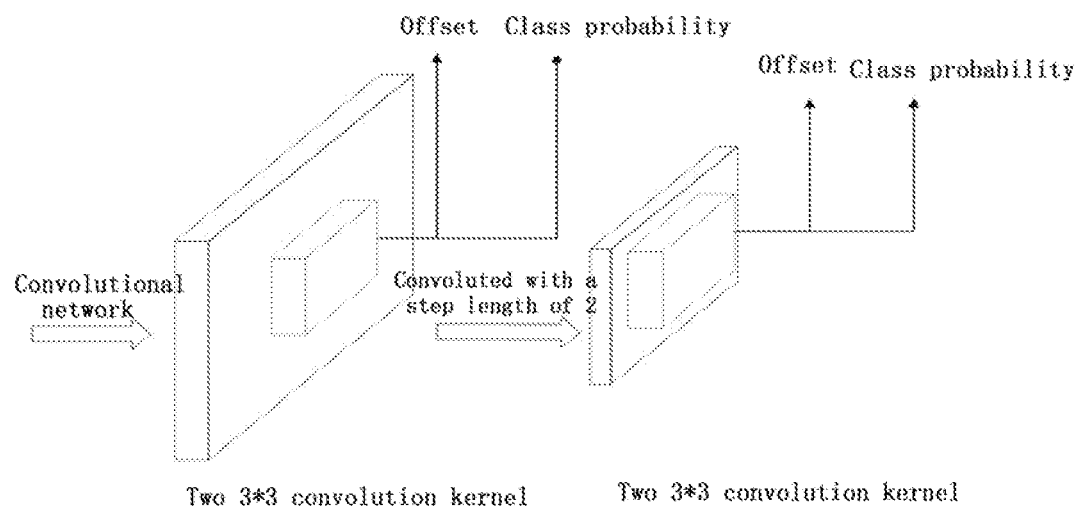
FIG. 4 is a structural diagram of a convolutional layer of a multi-scale convolutional network convoluted in parallel by two 3*3 convolution kernels according to an embodiment of the present disclosure.

Referring to FIG. 4, in one embodiment, the multi-scale convolutional network outputs a class probability and an offset between a location of the antenna and the predictive box after processing the image of the antenna with the predictive box by two convolutional layers convoluted in parallel by two 3*3 convolution kernels. The feature map of a higher convolutional layer covers a wider perceptual field, and a larger object may be detected; whereas the feature map of the lower convolutional layer covers a narrower perceptual field, and a smaller object may be detected.

Further, the multi-scale convolutional network connects 8732 parameters of each class probability after respectively performing a channel concat, to obtain a candidate box with a class predictive value and a regression predictive value. The ground truth box is obtained by performing local maximum searching on the candidate box based on a non-maximum suppression algorithm. Specifically, confidence scores of the candidate boxes are sorted from low to high, and the candidate box having the highest confidence score is selected as a pre-output box. An overlap rate between each candidate box and the pre-output box is calculated, the candidate box whose overlap rate is less than the threshold of 0.5 is selected as the ground truth box, and the area covered by the ground truth box is the optimal image of the antenna.

In one embodiment, the loss function used by the multi-scale convolutional network is $$L(x, c, l, g) = \frac{1}{N}(L_{conf}(x, c) + \alpha L_{loc}(x, l, g));$$

where N represents the number of the predictive boxes, a represents a preset weight, $L_{conf}$ represents a classification loss, and $L_{loc}$ represents a location loss.

$$L_{loc}(x, l, g) = \sum_{i \in Pos}^{N} \sum_{m \in \{cx,cy,w,h\}} x_{ij}^k smooth_{L1}(l_i^m - \hat{g}_j^m); x_{ij}^k$$

represents a value for determining whether the $i^{th}$ predictive box matches the $j^{th}$ ground truth box with respect to the class k, $l_i^m$ represents the predictive box, and $g_j^m$ represents the ground truth box.

$$L_{conf}(x, c) = -\sum_{i \in Pos}^{N} x_{ij}^p \log(\hat{c}_i^p) - \sum_{i \in Neg} \log(\hat{c}_j^0) \text{ where}$$

$$w\hat{c}_i^p = \frac{\exp(\hat{c}_i^p)}{\sum_p \exp(\hat{c}_i^p)};$$

"1" represents that the overlap rate between the $i^{th}$ candidate box and the $j^{th}$ pre-output box is greater than the threshold, and the class of the ground truth box is p, and $\hat{c}_i^p$ represents a predicted probability of the $i^{th}$ candidate box corresponding to the class p.

In one embodiment, according to the antenna target segmentation algorithm, a minimum spanning tree is constructed by classifying pixels within the ground truth box of the image of the antenna whose color distances $L_0$ are close into one class; and a regional fusion is performed based on a determination result obtained by comparing an intra-class variation and an inter-class difference. The color distance $L_0$ is determined by an RGB distance, wherein $L_0 = \sqrt{(r_1-r_2)^2+(g_1-g_2)^2+(b_1-b_2)^2}$.

The intra-class variation within one ground truth box is $$Int(c) = \max_{e \in (MST,E)} e,$$

where c represents a class, e represents a side having a minimum similarity in a minimum spanning tree of this class; the inter-class difference between two ground truth boxes is $$Diff(c_1, c_2) = \min_{v_i \in c_1, v_j \in c_2} \omega(v_i, v_j),$$

where $\omega(v_i, v_j)$ represents sides connecting Class $c_1$ and Class $c_2$, $v_i$ represents a point on the Class $c_1$, and $v_j$ represents a point on the Class $c_2$.

If the intra-class variation within one ground truth box is far less than the inter-class difference between two ground truth boxes, i.e., $Diff(c_1, c_2) \leq \min(Int(c_1), Int(c_2))$, it is considered that the two ground truth boxes belong to the same antenna, and a regional fusion is performed.

Figure 5:
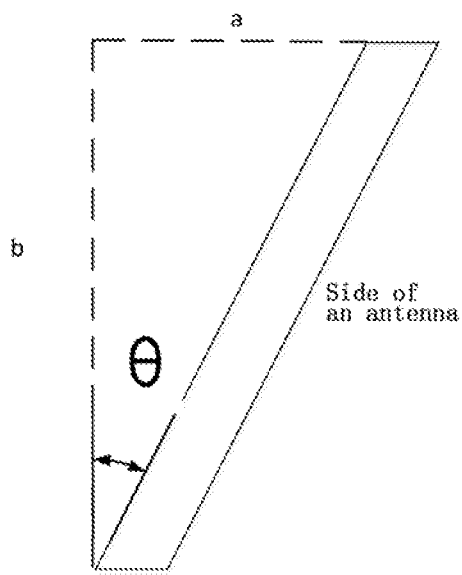
FIG. 5 is a schematic diagram of obtaining an antenna downtilt angle based on an antenna downtilt measurement algorithm according to an embodiment of the present disclosure.

Referring to FIG. 5, in one embodiment, a downtilt of an antenna is an included angle between the antenna and a vertical plane, and a formula for measuring an antenna downtilt angle based on the antenna downtilt measurement algorithm is $$\theta = \arctan\frac{a}{b},$$

where a diagonal length is denoted as a, and an adjacent side length is denoted as b. Finally, results of the antenna downtilt will be displayed on the server along with antenna segmentation images. The antenna segmentation images are used to ensure the correctness of the antenna detection results, and the results of the antenna downtilt are used to determine whether the antenna properly functions by comparing with expected values.

The above descriptions are merely preferred embodiments of the present disclosure, but the present disclosure is not limited to the above embodiments. Any embodiment should fall within the protection scope of the present disclosure as long as it achieves the technical effects of the present disclosure by the same means.

The invention claimed is:

1. A method for measuring an antenna downtilt based on a multi-scale detection algorithm, comprising:
   capturing an image of an antenna using an unmanned aerial vehicle;
   obtaining a ground truth box where the antenna is located by performing the multi-scale detection algorithm on the image of the antenna;
   segmenting the ground truth box based on an antenna target segmentation algorithm of a server; and
   obtaining an antenna downtilt angle based on an antenna downtilt measurement algorithm of the server;
   wherein the obtaining a ground truth box where the antenna is located based on the multi-scale detection algorithm of the server comprises:
     obtaining predictive boxes through a basic convolutional network; and
     obtaining the ground truth box through a multi-scale convolutional network; and
   wherein the obtaining predictive boxes through a basic convolutional network comprises:
     processing the image of the antenna by a plurality of series-connected convolutional layers, wherein the image of the antenna is max-pooled each time the image of the antenna is processed by one of the plurality of the series-connected convolutional layers;
     outputting a feature map by processing the max-pooled image of the antenna by two fully-connected layers and multiple layers of convolution kernels of different scales; and
     generating, on the feature map, the predictive boxes taking a center of the feature map as an origin and being concentric.

2. The method for measuring an antenna downtilt based on a multi-scale detection algorithm of claim 1, wherein the predictive boxes comprise two square predictive boxes and two rectangular predictive boxes.

3. The method for measuring an antenna downtilt based on a multi-scale detection algorithm of claim 1, wherein the obtaining the ground truth box through a multi-scale convolutional network comprises:
- outputting a class probability and an offset between a location of the antenna and the predictive box after processing the image of the antenna with the predictive boxes by two convolutional layers convoluted in parallel by two 3*3 convolution kernels;
- connecting parameters of the class probability after performing a channel concat, and obtaining, by using a loss function, a candidate box with a class predictive value and a regression predictive value; and
- obtaining the ground truth box by performing local maximum searching on the candidate box based on a non-maximum suppression algorithm.

4. The method for measuring an antenna downtilt based on a multi-scale detection algorithm of claim 1, wherein the segmenting the ground truth box based on an antenna target segmentation algorithm of a server comprises:
- constructing a minimum spanning tree by classifying pixels within the ground truth box of the image of the antenna whose color distances $L_0$ are close into one class; and
- performing a regional fusion based on a determination result obtained by comparing an intra-class variation and an inter-class difference.

5. The method for measuring an antenna downtilt based on a multi-scale detection algorithm of claim 4, wherein the color distance $L_0$ is $L_0=\sqrt{(r_1-r_2)^2+(g_1-g_2)^2+(b_1-b_2)^2}$, wherein r, g, and b represent color channels.

6. The method for measuring an antenna downtilt based on a multi-scale detection algorithm of claim 4, wherein the intra-class variation within one ground truth box is $$\text{Int}(c) = \max_{e \in (MST, E)} e,$$

wherein c represents a class, e represents a side having a minimum similarity in a minimum spanning tree of this class; the inter-class difference between two ground truth boxes is $$\text{Diff}(c_1, c_2) = \min_{v_i \in c_1, v_j \in c_2} \omega(v_i, v_j),$$

wherein $\omega(v_i, v_j)$ represents sides connecting Class $c_1$ and Class $c_2$, $v_i$ represents a point on the Class $c_i$, and $v_j$ represents a point on the Class $c_2$.

* * * * *